UNITED STATES PATENT OFFICE.

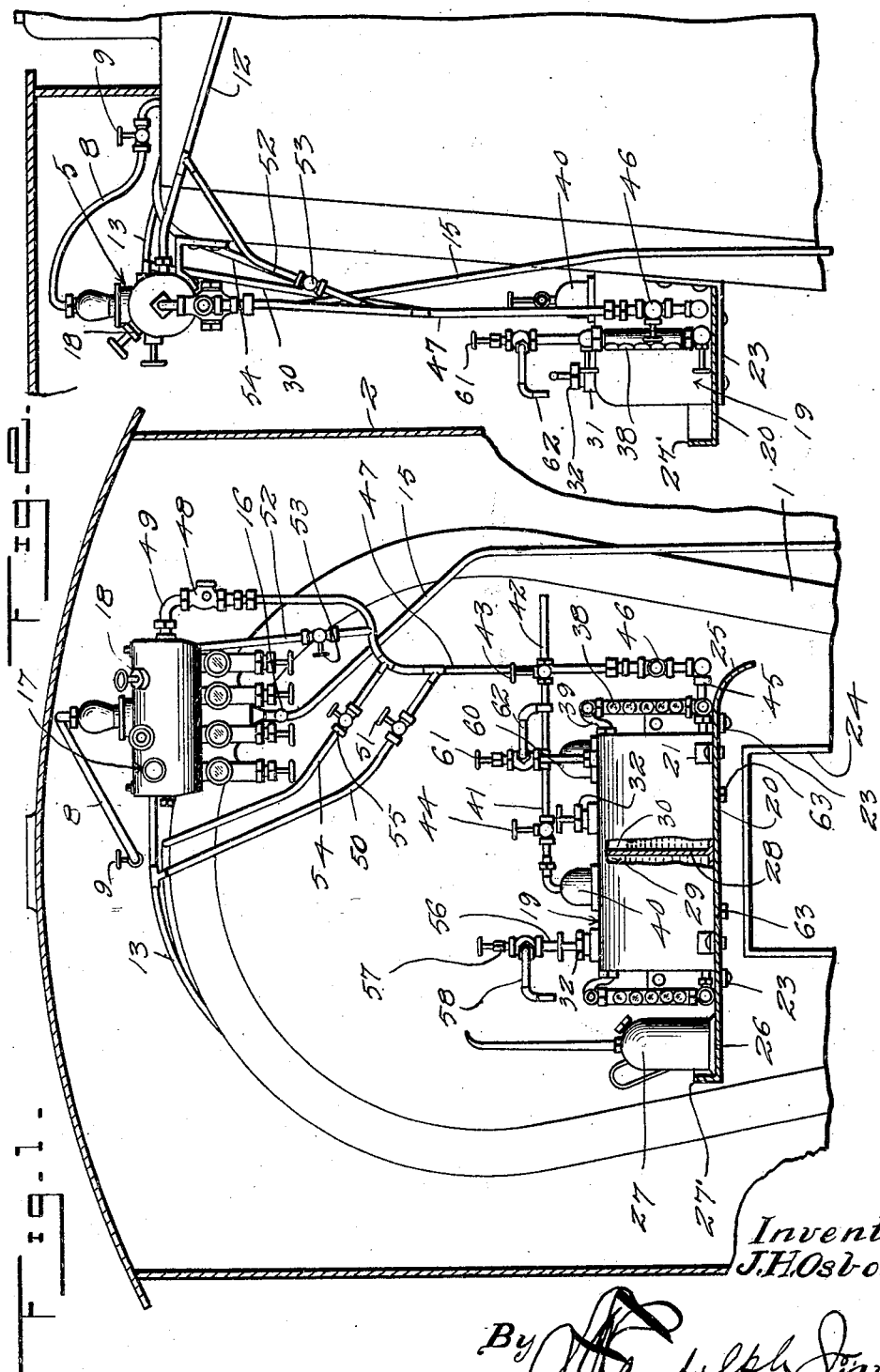

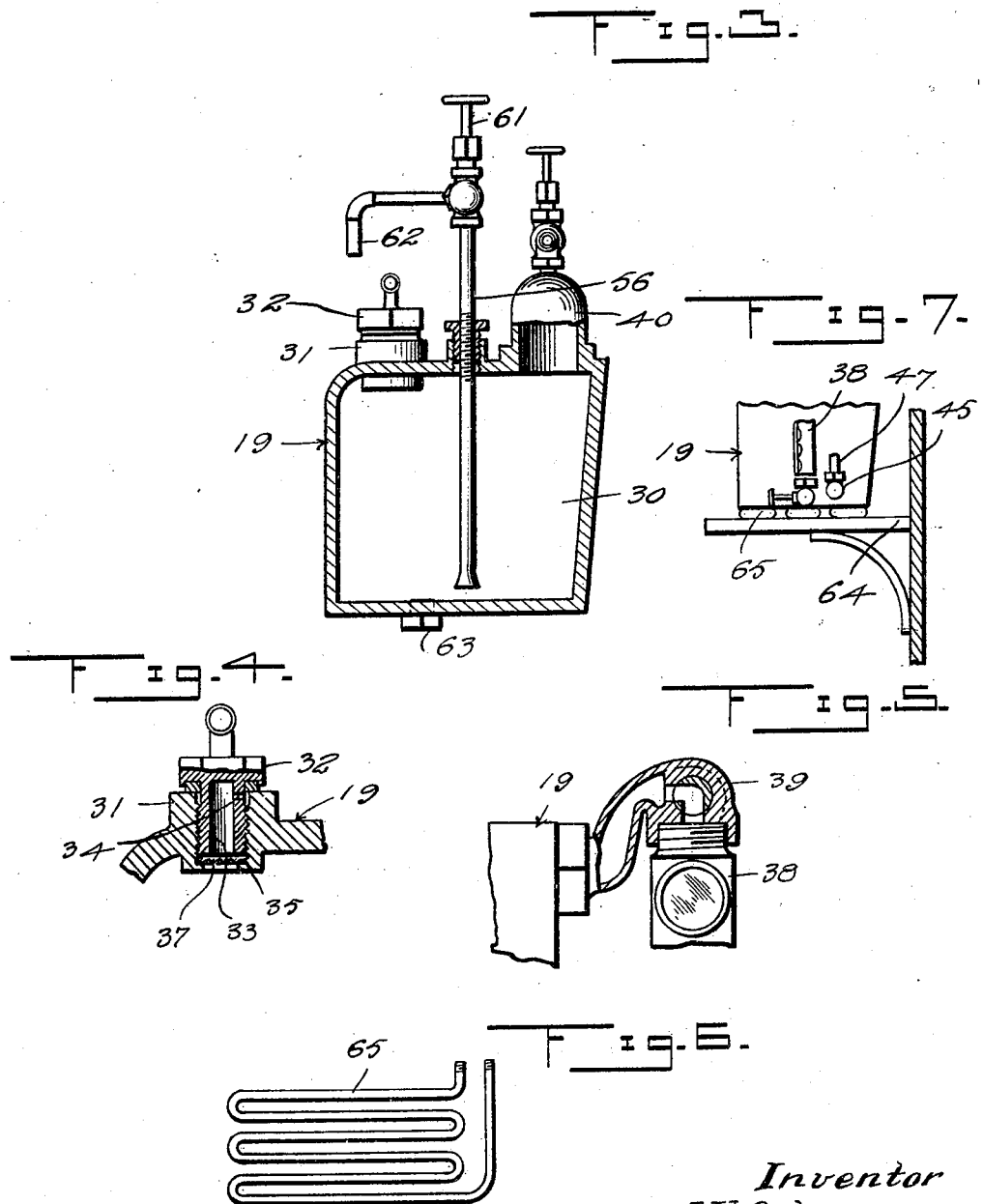

JAMES H. OSBORN, OF PRINCETON, WEST VIRGINIA.

FILLER FOR LUBRICATORS AND HAND-OILERS.

1,318,908.   Specification of Letters Patent.   Patented Oct. 14, 1919.

Application filed February 21, 1919. Serial No. 278,496.

*To all whom it may concern:*

Be it known that I, JAMES H. OSBORN, a citizen of the United States, residing at Princeton, in the county of Mercer and State of West Virginia, have invented certain new and useful Improvements in Fillers for Lubricators and Hand-Oilers; and I do hereby declare the following to be a full, clear, and exact description of the invention, such as will enable others skilled in the art to which it appertains to make and use the same.

This invention relates to new and useful improvements in fillers for lubricators and hand oilers and has for one of its objects the provision of means whereby the ordinary steam actuated lubricator of a locomotive can be refilled or supplied with lubricant when desired without danger to the operator and also obviates the inconveniences experienced in filling lubricators manually caused by their location on the boiler of the locomotive.

Another object of this invention is the provision of means whereby the lubricant furnished to the lubricator will be placed under air pressure so as to cause the lubricator to immediately function before the time elapses that is required to start the lubricator under its own source of power.

A further object of this invention is the provision of means whereby the lubricant can be furnished directly to the parts of the engine requiring such in case the lubricator becomes inoperative from some faulty part or in case of stoppage of some of its oil passages.

A further object of this invention is the provision of means whereby hand oilers can be filled with a grade of lubricant required for bearings and like parts of a locomotive and also may be furnished with lubricant used in the lubricator providing the engineer or operator would desire such.

A still further object of this invention is the provision of a filler for lubricators and hand oilers of the above stated character which shall be simple, durable, and efficient, and which may be manufactured and placed on a locomotive at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which—

Figure 1 is a transverse sectional view of a locomotive cab illustrating my invention applied to the boiler and connected with the main lubricator.

Fig. 2 is a fragmentary longitudinal sectional view of the same,

Fig. 3 is a sectional view of the auxiliary supplying means.

Fig. 4 is a detail sectional view of the filling cap,

Fig. 5 is a fragmentary sectional view of the means for connecting the upper end of the gage to the auxiliary lubricant filling means, Fig. 6 is a plan view of the steam heating coil, Fig. 7 is a fragmentary sectional view illustrating the auxiliary lubricating means resting upon the coil.

Referring in detail to the drawings, the numeral 1 indicates the boiler of a locomotive having associated therewith a cab 2 and a lubricator 5 of a well known type of construction. The lubricator 5 is equipped with the usual feed pipes 12 and 13 for conveying lubricant to the parts of the locomotive and the lubricator is supplied with steam from the boiler 1 by a pipe 8 having a controlling valve 9. A drain pipe 15 having a controlling valve 16 is connected to the lubricator whereby the same can be drained at any time desired.

It is very inconvenient to fill the lubricator 5 manually owing to its location on the boiler 1 of the locomotive as it is a considerable distance above the head of the engineer or operator and which is often dangerous. To overcome the above enumerated disadvantages in connection with lubricators of this type, I have provided an auxiliary filling tank or receptacle 19 which is detachably secured to a shelf 20 by brackets 21. The shelf 20 is secured to the boiler 1 by means of brackets 23 at a point directly over the fire door 24, so that the lubricant contained within the receptacle 19 will be heated by the heat from the boiler. One end of the shelf 20 is curved downwardly as illustrated at 25 for the purpose of forming a shade to prevent the rays of light from the fire box from interfering with the sight of the engineer located upon the right hand side of the cab 2, while the opposite end of the shelf extends beyond the receptacle 19 to form a supporting shelf 26 on which may be positioned a hand oiler 27 and other accessories required in the operation of a locomotive. The end 26 of the shelf 20 is disposed vertically to form a retaining flange 27' for preventing the accessories from sliding or falling off of the shelf during the movement or traveling of the locomotive. The receptacle 19 is divided by a partition 28 to form compartments 29 and 30 adapted to contain different grades of lubricant. Any number of compartments can be provided within the receptacle 19 for the purpose of carrying different grades and qualities of lubricant and in this instance I have elected to show a pair of compartments which are 29 and 30 respectively.

The top wall of the receptacle 19 has cast thereon bosses 31 which communicate with the compartments 29 and 30 and are internally screw threaded for the purpose of receiving closure caps 32. The closure caps 32 are threaded into the bosses 31 by means of hollow neck portions 33 which are surrounded by Babbitt gaskets 34 adapted to contact with the bosses when the closure caps 32 are turned home, thereby establishing an air tight connection of the closure caps with the receptacle 19. The neck portions 33 are provided with openings 35 so that upon turning or unthreading the closure caps partially from the bosses, whatever air pressure that may be within the receptacle 19 will be permitted to escape without injuring the operator. The lower ends of the bosses are provided with annular shoulders on which are positioned removable straining screens 37 adapted to filter or remove foreign matter from the lubricant as it is poured into the compartments 29 and 30 of the receptacle 19. Each end of the receptacle 19 is provided with a bull's-eye gage 38 of a well known construction. The upper end of the gage 38 is connected to the upper portion of the receptacle 19 by a curved pipe 39 which permits the upper end of the gage to be disposed in a plane above the connection of the pipe with the receptacle, so that approximately the entire amount of the lubricant within the receptacle can be gaged, either when the receptacle is entirely filled or partially filled.

The receptacle 19 has cast thereon air domes 40 having communication with the compartments 29 and 30 and have connected thereto pipes 41 and 42, which are in turn connected together in any suitable way and the pipe 42 is adapted to be connected to the air supply tank or source upon the locomotive which is usually employed for furnishing the air brake systems with air pressure. The pipe 42 is provided with a controlling valve 43 while the pipe 41 is provided with a controlling valve 44 so that the air pressure can be cut off from the compartments 29 and 30 when desired. An outlet pipe 45 is connected to the receptacle 19 and in communication with the compartment 30 and is provided with a controlling valve 46. The controlling valve 46 has connected thereto a pipe 47 which is connected to a check valve 48. The check valve 48 is connected to the lubricator 5 by a pipe 49 so that on opening the controlling valve 46, the lubricant within the compartment 30 will be conveyed into the lubricator 5 providing that the lubricator is empty. The air pressure within the compartment 30 received from the air reservoir of the locomotive is sufficient to force enough lubricant therefrom into the lubricator 5 to fill the same approximately seven-eighths full. Prior to furnishing the lubricator with lubricant, the controlling valve 16 is opened, so that refuse is drained therefrom and on closing the valve 16, atmospheric pressure is confined in the lubricator, and as the lubricant from the compartment 30 fills the lubricator the air therein is compressed, thereby placing the lubricant under pressure sufficient to immediately cause the lubricator to function or compel the lubricant to pass into the feed pipes for supplying the parts of the locomotive, thus eliminating the time lost in waiting for the steam to condense in the lubricator, before the lubricator will function of its own accord.

A pipe 50 is connected to the pipe 13 and to the pipe 47 and is provided with a controlling valve 51 so that on opening the valve 46, lubricant can be supplied directly to the pipe 13. A pipe 52 is connected to the pipe 12 and to the pipe 47 and is provided with a controlling valve 53 so that the lubricant can be supplied directly to the pipe 12 from the compartment 30 of the receptacle 19.

The valves 51 and 53 are opened when the lubricator becomes out of order for any reason so that the lubricant from the compartment 30 can pass directly to the feed pipes for supplying the parts of the locomotive. A pipe 54 having a controlling valve 55 is connected to the pipe 47 and to a pipe leading to the air compressor from the oil cup usually employed and (not shown) so that lubricant can be furnished to the oil cup at any time desired. This obviates the necessity of the operator manually filling the oil cup as it is very inconvenient owing to the location of the air compressors on the locomotive and also eliminates waste of lubricant by the old method.

A pipe 56 is connected to the compartment 29 of the receptacle 19 and is provided with a controlling valve 57 to which is connected an outlet spout 58 whereby the hand oiler 27 may be filled with lubricant from the compartment 29. A pipe 60 is connected to the receptacle 19 and in communication with the compartment 30 and is provided with a controlling valve 61 to which is connected a filling spout 62 so that the lubricant used in this compartment can be readily dispensed therefrom when it is desired to use such lubricant for other purposes than that of the lubricator.

The compartments 29 and 30 are provided with clean out plugs 63 so that the sediment within the compartments can be cleaned therefrom when desired and the clean out plugs 63 extend through openings in the shelf 20 so that they can be easily removed and replaced when desired.

When it is not convenient to mount the receptacle 19 over the fire door 24, the shelf 20 may be connected to some other portion of the locomotive within the cab as illustrated at 64 and the shelf has mounted thereon a coil pipe 65 adapted to be connected to a steam pipe so that the coils of the pipe 65 will be heated.

The receptacle 19 is positioned on the top of the coil so that the lubricant within the compartments thereof can be kept warm so that the lubricant will freely circulate.

While I have shown and described the preferred embodiment of my invention, it will be understood that minor changes in construction, combination and arrangement of parts may be made without departing from the spirit and scope of the invention as claimed.

Having thus described my invention what I claim is:—

1. A filler for lubricators and hand oilers including a lubricator of a locomotive, a shelf detachably secured to the locomotive at a point over the door of the fire box, a lubricating receptacle detachably secured to the shelf, means placing the lubricant within the receptacle under air pressure, means conveying the lubricant from the receptacle to the lubricator, means whereby the lubricant can be dispensed into a hand oiler from the receptacle, said shelf having one end extended beyond the receptacle to form a support for the hand oiler and having its edges disposed vertically to retain the hand oiler thereon.

2. The combination with the lubricator of a locomotive and the feed pipes thereof, of a lubricant storage tank, a main supply pipe communicating with said tank and said lubricator, auxiliary supply pipes communicating with said main pipe and communicating at points beyond said lubricator with said feed pipes, valves in said main and auxiliary supply pipes, and means for conveying pressure to said storage tank.

3. The combination with the lubricator of a locomotive and the feed pipes thereof, of a lubricant storage tank, a main supply pipe communicating with said tank and said lubricator, auxiliary supply pipes communicating with said main pipe and communicating at points beyond said lubricator with said feed pipes, a second auxiliary pipe connected to the main supply pipe and to an air compressor, valves in said main and auxiliary supply pipes, and means for conveying pressure to said storage tank.

In testimony whereof I affix my signature in presence of two witnesses.

JAMES H. OSBORN.

Witnesses:
E. WARDELICH,
BENNETT S. JONES.

Copies of this patent may be obtained for five cents each, by addressing the "Commissioner of Patents, Washington, D. C."